United States Patent [19]

Mawardi

[11] Patent Number: 4,539,040
[45] Date of Patent: Sep. 3, 1985

[54] BENEFICIATING ORE BY MAGNETIC FRACTIONAL FILTRATION OF SOLUTES

[76] Inventor: Osman K. Mawardi, 15 Mornington La., Cleveland Heights, Ohio 44106

[21] Appl. No.: 420,090

[22] Filed: Sep. 20, 1982

[51] Int. Cl.³ .............................................. C22B 1/00
[52] U.S. Cl. .................................... 75/1 R; 75/1 T; 75/101 R; 210/695
[58] Field of Search .................... 75/1 R, 1 T, 101 R; 210/695

[56] References Cited

U.S. PATENT DOCUMENTS

| | | | |
|---|---|---|---|
| 2,329,893 | 9/1943 | Girard | 209/215 |
| 2,430,157 | 11/1947 | Byrd, Jr. | 210/1.5 |
| 3,719,583 | 3/1973 | Ustich | 204/301 |
| 3,770,629 | 11/1973 | Nolan | 210/42 |
| 3,850,811 | 11/1974 | Wheelock | 210/223 |
| 3,983,033 | 9/1976 | de LaTour | 210/49 |
| 4,026,805 | 5/1977 | Fowler | 210/223 |
| 4,067,953 | 1/1978 | Roux et al. | 75/1 R |
| 4,157,953 | 6/1979 | Mawardi | 209/213 |
| 4,167,480 | 9/1979 | Mach | 210/695 |
| 4,209,394 | 1/1980 | Kelland | 210/425 |
| 4,247,398 | 1/1981 | Mohri | 210/222 |
| 4,306,970 | 12/1981 | Tanaka et al. | 210/222 |
| 4,402,735 | 9/1983 | Jepsen | 75/1 R |

FOREIGN PATENT DOCUMENTS

| | | | |
|---|---|---|---|
| 630057 | 3/1963 | Belgium | 75/1 R |
| 2160712 | 7/1973 | France | 75/1 R |

OTHER PUBLICATIONS

Giddings, J. C., A New Separation Concept Based on a Coupling of Concentration & Flow Nonuniformities, Separation Science, 1966, pp. 123–125, vol. 1.

Giddings, J. C., Nonequilibrium Theory of Fluid-Flow Fractionation, Journal of Chemical Physics, Jul. 1, 1968, pp. 81–85, vol. 49.

Vickrey, T. M., et al.; Magnetic Field-Flow Fractionation, Separation Science & Technology, 1980, pp. 1297–1304, vol. 15.

Atroschenko, L. S. et al.; Diffusive Processes in Magnetic Fields, Teor. Khim. Teknol., 9, (3), pp. 439–442, (1975), (In Russian).

Primary Examiner—L. Dewayne Rutledge
Assistant Examiner—Christopher W. Brody
Attorney, Agent, or Firm—Frederic B. Schramm

[57] ABSTRACT

One solute is selectively filtered from a mixture of solutes by making use of the difference between the magnetic susceptibilities of the solutes.

Fluid streams of the substances to be filtered are subjected to intense magnetic field gradients to effect the separation or filtration. At points of high magnetic gradient or intense magnetic field, the substance of greater magnetic susceptibility, or the paramagnetic substance distinguished from a non-paramagnetic substance, is deflected laterally through a path of variable resistance to flow so that it separates from non-paramagnetic substance.

8 Claims, 5 Drawing Figures

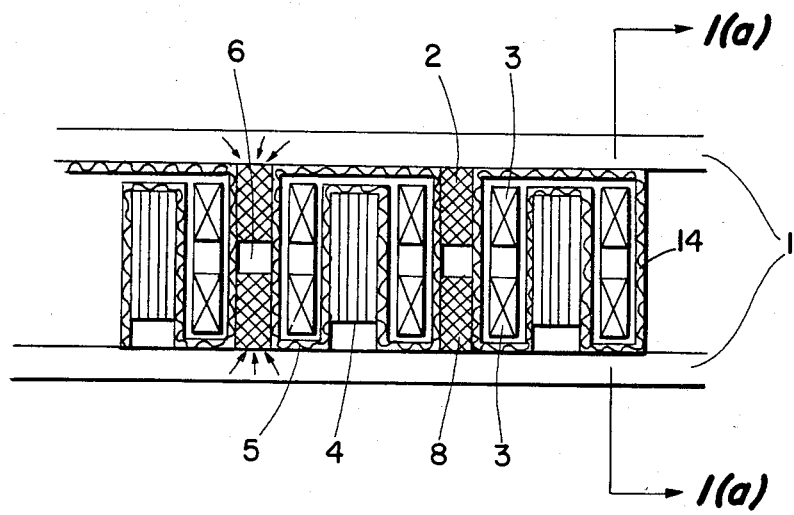
Fig. 1(b)
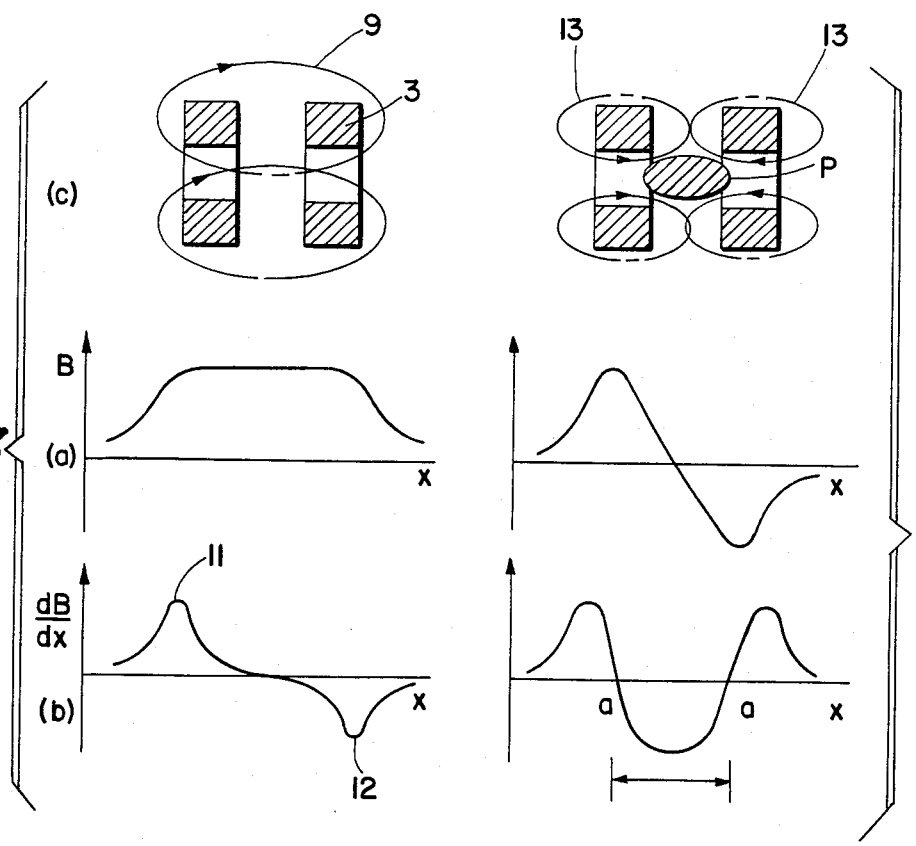
Fig. 3
Fig. 4

BENEFICIATING ORE BY MAGNETIC FRACTIONAL FILTRATION OF SOLUTES

BRIEF DESCRIPTION

In carrying out the invention in a preferred form thereof, a separator is provided comprising two parallel channels through which fluids to be separated are passed. Pairs of magnetic coils are mounted between the channels, straddling periodic, flat, tubular passages between the channels. The passages are partially plugged with material substance to form a desired solute such as glass wool to introduce resistance to flow. High current is passed through the coils to produce areas of high magnetic flux gradient at the connections of the passageways to the channels in order to divert the paramagnetic fluid substance or the substance of greater magnetic susceptibility into the passages. The passages are interconnected with a cross duct for receiving the separated fluid.

A better understanding of the invention will be afforded by the accompanying drawings in which FIG. 1(a) is a view of a vertical section through the channels and one of the coils of the apparatus, cut by plane 1(a)—1(a) of FIG. 1(b).

FIG. 3 is a graph of the magnetic flux gradient at the axis of the coils when the coils are connected to have magnetic fields aiding, and FIG. 4 is a graph representing the condition with magnetic fields in opposition.

Like reference characters are employed throughout the drawings to represent like parts.

DETAILED DESCRIPTION

Figure 1A:
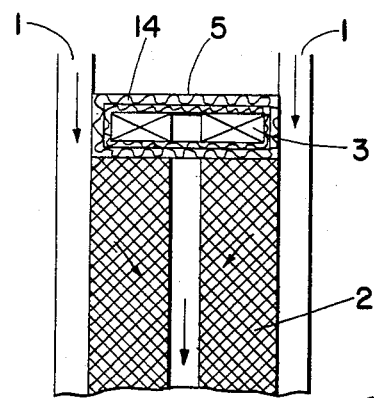
FIG. 1(b) is a view of the horizontal cross section represented as cut by the plane 1(b)—1(b) of FIG. 2.
Figure 1A:
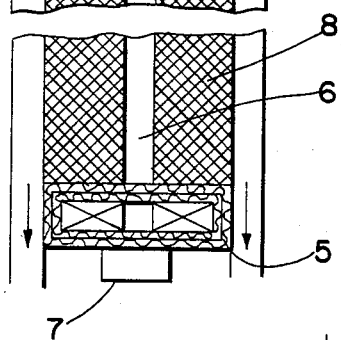

The invention is adapted to the separation of fluids or substances which can be converted to fluids as by solution and which differ in magnetic susceptibility. The invention does not exclude the separation of gases such as oxygen or nitrogen from air, although other methods are available for oxygen and nitrogen separation.

A particularly advantageous utilization of the invention is in mineral beneficiation and in processing of ores, especially those of valuable metals such as molybdenum, uranium, cobalt, chromium and nickel. The ore is treated with a solvent that dissolves the desired metal or mineral substance to form a solution of a desired solute together with other unwanted components, also solutes. Specific examples of ore beneficiation are the extraction of uranium from phosphate deposits, the enrichment of chromium from low grade Montana chromite, the extraction of trace elements from United States Eastern Shales and isolation of nickel from Laterite.

Other applications in which the invention can be used are: chemical processing and waste recovery. In chemical processing one may have a feedstock consisting of a mixture of liquids and of which one of these liquids is a solution of a paramagnetic salt. The separation of the latter solution by magnetic fractionation can be done more economically than by chemical means.

Waste solutions from industrial electroplating, etching and pickling operations contain several valuable metals which can be separated by magnetic fractionation. Specific examples are the separation of chromium and nickel from other metals such as copper and zinc.

In the embodiment of the mineral beneficiation apparatus illustrated in the drawings, there are two parallel channels 1 composed of nonmagnetic material such as stainless steel. The upper ends of the channels serve as inlets for a mixture of solutions which flow downward. The channels are preferably of rectangular cross-section.

Flat, tubular passages 2 are connected at spaced points between the channels 1. The flat passages 2 are also formed of nonmagnetic tubing. For producing the requisite magnetic field, electric coils 3 are provided which straddle the passages 2. As shown in FIGS. 1(a) and 1(b), the passages 2 are partially plugged with a material such as fiberglass wool 8 which serves to interpose resistance to flow through the passages. High permeability, iron slabs 4 are placed between the magnetic coils 3 to minimize the magnetic reluctance of the return paths of the lines of force outside the coils.

For isolation of the coils 3 from the ore solution, a container 5 is provided completely enclosing the coils 3. The glass wool plugs 8 are short enough to leave narrow central passageways or channels 6, interconnected to a cross-duct or trough 7.

Suitable means, not shown, are provided as known in the cryogenic art for introducing a very low temperature coolant such as liquid helium into the container 5 and circulating the coolant for maintaining the coils 3 at such low, cryogenic temperature that the coils may carry very large currents and induce flux of such great magnitude as to be effective for deflecting fluid streams of even negligible magnetic susceptibility.

The container 5 is lined with super insulation 14 to minimize thermal losses. The insulation may comprise loosely packed reflectorized sheets of suitable material such as mylar in evacuated wrappings as known to those skilled in the cryogenic art.

The method of operation of the separator, when the coils 3 are connected to carry electrical current such that their magnetic fields are aiding, is illustrated in the graph of FIG. 3. The curve of FIG. 3(a) represents flux density plotted against distance measured along the flat tubular passages 2 surrounded by the coils 3 having lines of force with direction indicated by the loops 9. The flux density is greatest within the coils 3 and tapers off along the coil axis toward the channels 1. The slope of the flux density curve is consequently greatest at the coil ends, so that positive and negative peaks 11 and 12 in the rate of change dB/dx or flux gradient, FIG. 3(b), occur at the ends of the tubular passage 2 coinciding with the coil ends.

The sign of the gradient is opposite ends of the passage 2, and the paramagnetic substance or salt in the fluid stream is acted upon by forces that tend to cause flow laterally inward from the channels 1 through the passageway 6. On the other hand, midway between the coil ends at the passage 6, $$\frac{dB}{dx} = 0$$

The solute, sensing no lateral force there, will flow to the trough 7 by gravity, or if desired, under the influence of a pressure gradient produced by a pump, not shown.

Owing to the presence of the fiberglass plugs 8 in the tube 2, the impedance of the channels 1 to flow is considerably less than that in the tube 2 having the fiberglass. Consequently, the fluids tend to flow mostly in the channels 1. If the magnetic force sideways is greater than the resistance of the fiberglass, the magnetic solute, however, will flow laterally and be separated from the main body of the fluid. The height of the coils 3 will be determined by the necessary retention time needed to produce an effective separation. The number of coil pairs is fixed by the width of the separator, which in turn depends upon the mass of material to be processed in a given time.

The magnitude of the gradient at the entrance of the passage 6 can be increased if the currents in the coils cause their magnetic field to oppose each other as indicated by loops 13. The corresponding field distribution and gradient is shown in FIG. 4. In this case, the force on the solution of paramagnetic salt is in such a direction as to propel the solution from the passage 6 back into one of the channels 1. In order to prevent the fluid from being subject to reversal of the magnetic forces, part of the region between the coils is blocked. For this purpose a non-magnetic metal bar P of cross-section as illustrated in FIG. 4(c) is inserted in the center of passage 2.

Since the region a—a is blocked, the fluid is under no lateral forces in the central passageway 6 and can flow downward toward the trough 7.

It will be observed that the selective filtration in fluid form is a continuous process and is adaptable to the treatment of large volumes.

Figure 2:
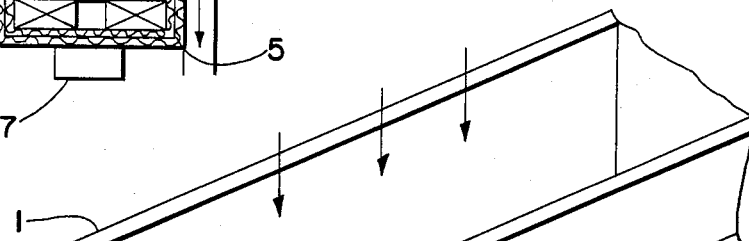
FIG. 2 is a fragmentary perspective view of the apparatus with one of the channels removed.
Figure 2:
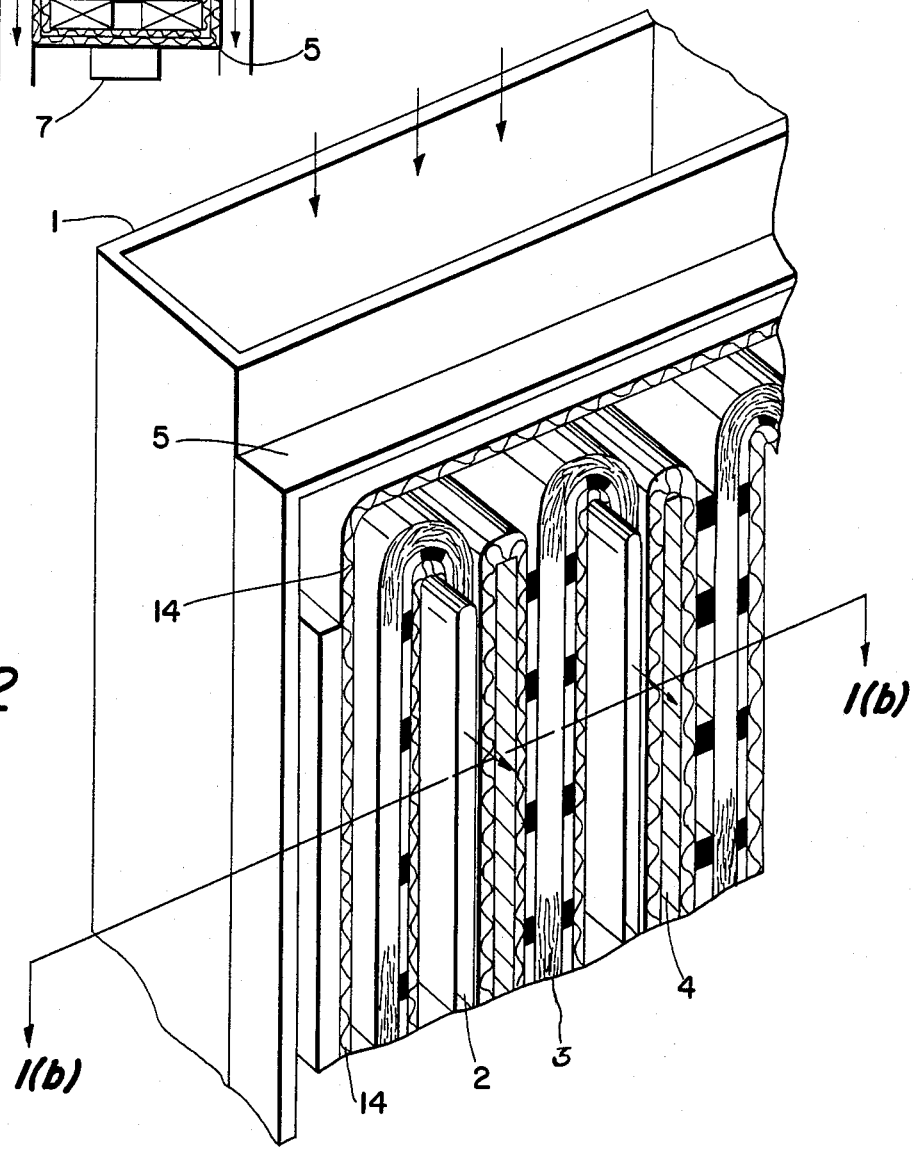

The invention does not exclude the provision of fluid columns through which all the fluid to be separated is passed, with the columns located at steep points of the flux density curve to give high flux gradient. In this case, plugs of magnetizable steel wool are mounted in the fluid columns to pass non-paramagnetic substances and retain paramagnetic material until flushed out. The improved arrangement of FIGS. 1(a), 1(b), and 2, however, enables the process to be continuous with no need for intermittent flushing.

The feasibility of the process described in connection with the drawings was ascertained by estimating the separation force on the ion. This force, of magnetic origin, is then compared to an opposing force, diffusive in character, and which tends to cause the paramagnetic ions to be dispersed in the fluid.

The starting points of the arguments are the governing equations for a two-fluid system viz., the solution of the paramagnetic ions and the rest of the solutes. The equation (of conservation of momentum) for the paramagnetic ions is:

$$n_1 m_1 (v_1 \cdot \text{grad}) v_1 = -\text{grad} p + n_1 P \text{grad} B + n_1 m_1 A_{12} v_1 \qquad (1)$$

While for the rest of the solutes (not magnetic)

$$n_2 m_2 (v_2 \cdot \text{grad}) v_2 = \text{grad} p + n_2 m_2 A_{12} v_2 \qquad (2)$$

in the above $n_1, n_2$ = number of particles/unit volume
$m_1, m_2$ = masses of molecules or ions of species (1) and (2)
$p_1, p_2$ = solute partial pressure
$B$ = flux density
$P$ = magnetic moment/particle
$A_{12}$ = collision frequency of particles (1) with particles (2)
$v_1, v_2$ = velocity of solute 1 and 2, respectively Notice that the Coulomb forces have not been written down. Actually, they have been considered: if we deal with ions then Equation (1) is the sum of two equations; one for the anions, the other for the cations, in which when we add the two, the Coulomb forces cancel each other. The magnetic force is then that on the molecule. Usually, the paramagnetism of the ion is dominant, hence the above statement applies.

Filtration becomes effective if one can show that $$(n_1 P \text{grad} B) \text{ greatly exceeds } (n_1 m_1 A_{12} v_1) \qquad (3)$$

Now $P = M/N_1$ where $M$ is the intensity of magnetization. But $M = \overline{X} H$ where $\overline{X}$ = susceptibility of species (1) to be separated and $H$ = magnetic field Hence $$P = \frac{\overline{X} H}{n_1} \qquad (4)$$

Similarly from Einstein's equation for diffusion $$D = \frac{kT}{m_1 A_{12}} \qquad (5)$$

where
  $D$ = diffusion coefficient
  $k$ = Boltzmann's constant and
  $T$ = temperature
For filtration to be possible, therefore we must have $$\overline{X} H \text{ grad } B \text{ greatly exceeds } \frac{n_1 kT}{D} v_1 \qquad (6)$$

since $H = B/P_1$, where $P_1$ = permeability of solute $$\overline{X} B/P_1 \text{ grad } B \text{ exceeds } n_1 kT v_1/D \qquad (7)$$

It is convenient, however, to use the specific (i.e., per unit mass) susceptibility. The latter denoted by $\overline{X}^*$ is such that $$\overline{X}^* = \frac{\overline{X}}{P_o} \text{ (density)} = \frac{\overline{X}}{n_o m_1} \qquad (8)$$

this means that $$\frac{\overline{X}}{n_o m_1} \cdot m_1 \frac{B}{P_1} \text{ grad } B \text{ exceeds} \qquad (9)$$

$$\frac{n_1}{n_o} kT \frac{v_1}{D}$$

In the above $n_1/n_o$ = concentration of solute to be separated while $n_o$ is the density at (STD), i.e., as given by Avogadro's number
Now $k = 1.38 \times 10^{-16} \text{ergs}/°K.$ $m = 5.31 \times 10^{-22} \text{gm}$ (for uranium trioxide)

$\overline{X}^* = 1.01 \times 10^{-6}/\text{gm}$

The left side of the inequality (9) is hence $$(1.01 \times 10^{-6}) \times 5.31 \times 10^{-22} \frac{B}{P_1} \text{ grad } B = \qquad (10)$$

$$5.71 \times 10^{-28} B \text{ grad } B$$

The right hand side, on the other hand, is $$\frac{n_1}{n_o} \frac{v_1}{D} kT = (10^{-4})(10^{-4}) 1.38 \times 10^{-16} \times 300 = .41 \times 10^{-21} \quad (11)$$

If we assume conservatively that grad B is of the order of B/L of the order of B/1 then $$0.574 \times 10^{-27} B^2 \text{ must exceed } 0.41 \times 10^{-21}$$

This immediately points to the need for *very* high fields; such as produced by superconducting magnets. Therefore
if B is of the order of $10^4$; the inequality is $$0.574 \times 10^{-19} \text{ exceeds } 0.41 \times 10^{-21}$$

if B is of the order of $3 \times 10^4$; the unequality is $$5.17 \times 10^{-19} \text{ exceeds } 0.41 \times 10^{-21}$$

In the second example, the margin is satisfied with a margin of better than $10^3$; we thus conclude that selective filtration can be accomplished magnetically.

The calculation performed for Uranium can be repeated for other salts. The table shown below gives the relative performance in terms of the parameter $X_{ml}*$. The higher the value of this number, the more effective the separation.

| Substance | $X_{ml}* \times 10^{22}$ cgs units |
|---|---|
| $UO_3$ | 5.5 |
| $Mn_2O_3$ | 298 |
| $M_nSO_4$ | 294 |
| $F_eCl_2$ | 363 |
| $F_eSO_4$ | 230 |
| $N_iCl_2$ | 127 |

It is not difficult to estimate the characteristic time needed to separate the solute of the paramagnetic salt from the mixture of solutes. Using the arguments given by equations (1) to (11) together with the relation for the conservation of mass one finds that for a flux density of $10^4$ gauss and for a magnetic field gradient of $10^4$ gauss per cm., the time needed is approximately 10 secs. The magnetic separator therefore must be at least 10 cm. long if the liquid flows with a velocity of 1 cm. per sec. Since the characteristic time for diffusion goes inversely with the square of the flux density, doubling the strength of the field would reduce the length by a factor of four.

Certain embodiments of the invention have been shown herein and particularly described and certain methods of operation embraced therein have been explained for the purpose of explaining the principle of operation of the invention and showing its application, but it will be obvious to those skilled in the art that many modifications and variations are possible and it is desired, therefore, to cover all such modifications and variations as fall within the scope of the invention.

I claim:

1. The method of beneficiating ore which comprises the steps of:
   a. Dissolving the ore in a solvent to form a mixture of solutes in solution, including a desired solute in this mixture differing in magnetic susceptibility, said desired solute having a relatively high magnetic susceptibility,
   b. passing the mixture in a main stream,
   c. subjecting the main stream to a lateral high gradient magnetic field at a selected point to form a lateral stream,
   d. thereby deflecting from the main stream in the lateral stream at that point, solvent with said desired solute having greater magnetic susceptibility than the solvent with the other solute in the main stream,
   e. interposing flow resistance in the lateral stream, whereby the solvent with the said desired solute subjected to lateral magnetic forces overcomes such flow resistance enabling it to continue in the lateral stream and
   f. the solvent with the other solute with lower or no magnetic susceptibility, unable to overcome the flow resistance in the lateral stream, remains out of the lateral stream and continues in the main stream and the solvent with the desired solute in the lateral stream is separated from the mixture of solutes obtained from the ore.

2. The method defined in claim 1 further comprising the steps of:
   a. Passing the mixture in parallel main streams,
   b. subjecting the main streams to lateral magnetic field at substantially opposite points,
   c. deflecting the solvent with greater magnetic susceptibility solute inward in opposing lateral streams with flow resistance interposed except at the inward ends of the lateral streams, whereby the lateral streams join to discharge the solvent with solute of greater magnetic susceptibility.

3. The method defined in claim 1 wherein: The magnetic deflecting force beyond the flow resistance in the lateral stream is substantially zero, thereby collecting the solvent and desired solute in the lateral stream beyond the flow resistance.

4. The method of beneficiating ore which comprises the steps of:
   a. Dissolving the ore in a solvent to form a mixture of solutes in solution including a desired solute in the mixture, the solutes differing in magnetic susceptibility, said desired solute having a relatively low magnetic susceptibility,
   b. passing the mixture in a main stream,
   c. subjecting the stream to a high gradient magnetic effect for preventing continued travel in the main stream of solute of greater magnetic susceptibility, while allowing solution containing said desired solute of relatively low susceptibility to travel without interruption, and
   d. removing the solute of greater magnetic susceptibility from the main stream.

5. The method of beneficiating ore which comprises the steps of:
   a. Converting the ore to a mixture of solutes in solution that differ in magnetic susceptibility, one solute having relatively high magnetic susceptibility, and one of the solutes in the mixture being a desired solute,
   b. Passing the mixture in a stream,
   c. Applying high gradient magnetic force laterally at a point in the stream to produce differential deflection, whereby solutes of greater and less magnetic susceptibility continue in divergent streams, and d. Collecting the desired solute contained in one of the divergent streams to separate said desired solute from the mixture of solutes obtained from the ore.

6. The method defined in claim 5 further comprising the steps:

a. Subjecting solutes in the solution to diffusive forces, whereby the solutes react oppositely to magnetic forces and diffusive forces, and b. Applying magnetic force of sufficient magnitude to overcome diffusive force and deflect said solutes of greater magnetic susceptibility into a lateral path.

7. The method defined in claim 6 further comprising the steps of:

a. interposing flow resistance in the lateral path whereby solute in the lateral path overcomes such flow resistance by reason of the lateral magnetic force and continues in the lateral path to be collected, and b. having the other solute remain out of the lateral path.

8. The method of beneficiating ore described in claim 1 wherein the intensity of the lateral magnetic field is of the order of magnitude accomplished by the flow of electrical current in a coil maintained at a low cryogenic temperature such as that of liquid helium.

* * * * *

UNITED STATES PATENT OFFICE
CERTIFICATE OF CORRECTION

Patent No. 4,539,040                                  Dated September 3, 1985

Inventor(s) Osman K. Mawardi

It is certified that error appears in the above-identified patent and that said Letters Patent are hereby corrected as shown below:

Column 1, line 13, cancel

"substance to form a desired solute", so that the sentence will read:
--The passages are partially plugged with material such as glass wool to introduce resistance to flow.--

Column 2, line 53, before "opposite", insert

--opposite at--

Signed and Sealed this

Fourteenth Day of January 1986

[SEAL]

Attest:

Attesting Officer

DONALD J. QUIGG

Commissioner of Patents and Trademarks